May 7, 1935.  J. APFEL ET AL  2,000,460
LAWN EDGER AND WEEDER
Filed May 9, 1933
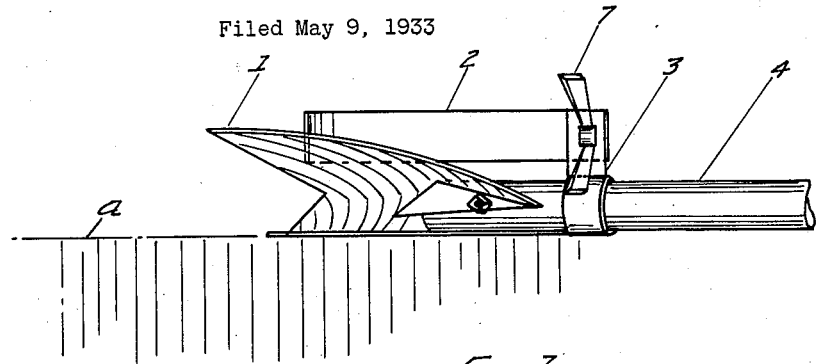
Fig. 1
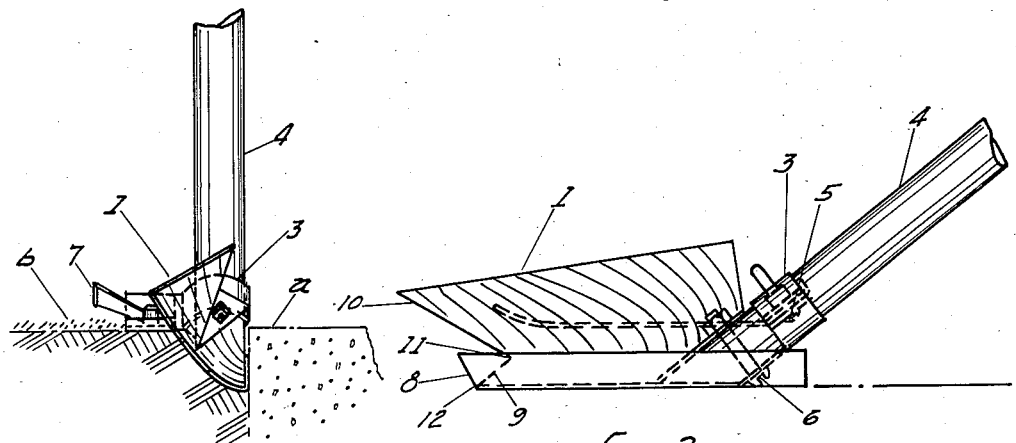
Fig. 3   Fig. 2
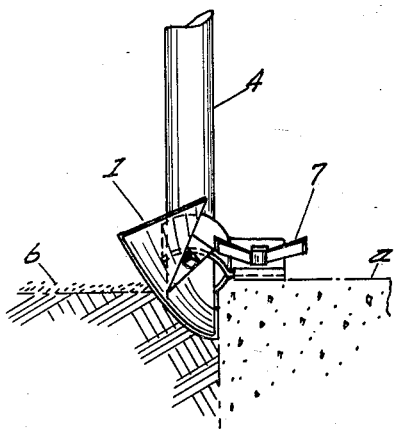   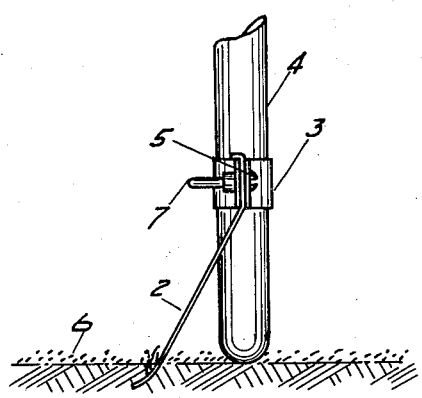
Fig. 4   Fig. 5
Inventors
Jacob Apfel
George Zing
Richard S Jarrett Patented May 7, 1935

2,000,460

UNITED STATES PATENT OFFICE 2,000,460

LAWN EDGER AND WEEDER

Jacob Apfel, George Ling, and Richard S. Jarrett, Hamilton, Ohio

Application May 9, 1933, Serial No. 670,074

1 Claim. (Cl. 97—227)

The object of our invention is to produce a tool that is light, simple, strong and durable and easy to construct and operate and that can be manufactured and sold at a low price. Further stated our object is to provide a tool that trims edges of lawns, around walks, drives and other like areas, mostly where lawns join sidewalks or walls, whereby the grass, sod or earth is removed adjacent to the walk or wall and at the same time an even groove or channel is formed thus improving the appearance and providing a place for water to settle into. The cuttings are also deposited in a convenient place upon the walk or drive where they are easily swept away or removed. Our invention still further relates to a device of this character, easily regulated to trim and groove the lawn or earth at various desired depths and widths, and the groove that is cut can be made to evenly follow either the contour of the lawn or earth or else the top surface of the walk, drive or wall.

Furthermore our device can be kept in perfect working condition by easily being sharpened without removing any of the working parts. Our invention still further relates to a device that can be used as a tool to remove weeds or other objectionable objects as might be found in the lawn or earth.

More particularly stated our invention consists of a front inclined and proceeding cutting edge on a blade made from a single piece of sheet metal or other suitable material formed into a certain U shaped scoop, that is securely fastened onto a suitable round or other shaped handle. The handle carries a supporting runner or guide that can be raised or lowered and operated at either side and end of the handle.

In the accompanying drawing: Figure 1 represents the plan view of our lawn edger, with runner or guide set to follow the contour of the lawn or earth.

Figure 2 is a side elevation of Figure 1.

Figure 3 is a front elevation of Figure 2.

Figure 4 is a view similar to Figure 3, except showing the runner or guide set to follow the top surface of the walk or wall.

Figure 5 is a view showing how our lawn edger and weeder can be used as a weeder.

Referring to the drawing; 1 indicates a blade made from a single piece of sheet metal or other suitable material. The forward edge of blade 1 is sheared and sharpened at different angles 9 and 10 and then formed into a certain U shape, cross sectionally at point 11, making converging cutting edges 8—9 and 10 meeting at points 11 and 12. The cutting edge 10 projects forward and above the cutting edge 9, thus shearing the grass or earth in advance of point 11. This assures an even and not ragged groove and at the same time holds down and prevents matted and over-hanging grass from climbing up and over the top of side wall on blade 1. The bottom portion of blade 1 slopes backward and away from cutting edge 9 and point 11 leaving a floor or bottom that eventually ends in a flat bent shoe that is shaped and fastened to underside of handle 4. The side or wall portion of blade 1 inclines longitudinally upward and backward from cutting edge 10, and tapers across handle 4 where it is securely fastened by bolt or rivet 6 as shown in Figure 2. The rearward and inclined sloping of blade 1 as just mentioned deflects the cuttings away from the side of blade 1 and onto the sidewalk or drive.

The holder 3 wraps around and extends a short distance away from handle 4, to allow fastening of runner 2 by bolt 5 and thumb nut 7. The pressure applied on thumb nut 7 clamps both the runner 2 and holder 3 securely in place on handle 4.

The runner 2 is flat and has the forward end sharpened into a V notch and turned up slightly. The length of runner 2 longitudinally is bent parallel to the base of the blade 1 when clamped in place on the handle 4, and must be sufficiently long to prevent tilting of blade 1 when pushed forward by the handle 4.

The handle 4 is round or other shape and inclines rearward and upward from the base of blade 1. The length of handle 4 must be long enough to operate our lawn edger and weeder without stooping or bending over.

The runner 2 is interchangeable and operates horizontally from either side of the handle 4. It is placed upon the surface of the grass or earth "a" or upon the top of walk, wall or drive "b", as desired. Then the depth of the cutting or outlining is determined and by loosening nut 7 which in turn loosens holder 3 upon handle 4, the blade 1 can be set at the proper height by sliding the handle 4 thru holder 3. After tightening nut 7, the device is pushed forward by means of handle 4; then the U-shaped scoop with forward cutting edges, 8—9 and 10 trims and cuts the grass or earth away from the edge of the walk, wall or drive "b" to the various desired widths and depths. This forms a uniform groove or trench running either parallel with the top of walk, wall or drive "b" or else following the contour of the grass or earth "a", as desired. The groove or trench formed will come directly against the vertical side of the same walk, wall or drive, as handle 4 and blade 1 have no offset or flange extending towards this walk, wall or drive and, therefore, does not prevent the close trimming against the same.

The runner 2 and holder 3, without in any way adding to or changing the structure of the device, can be removed together from handle 4 and placed at the other end of this handle or any other handle, leaving the forward end of runner 2 protruding downward and away, and after clamping in place by nut 7, like in Figure 5, our device can be used to remove weeds or other objectionable objects from the lawn or earth.

Thus it can be seen that we have devised an extremely simple and useful lawn edger and weeder, that effectively cuts away from the vertical sides of a walk, wall or drive the grass or earth evenly and uniform, at various desired widths and depths and these desired widths and depths can follow either the contour of the grass or earth or else the top surface of the walk, wall or drive; that is easily kept in working shape by sharpening the cutting edges without removing any of the working parts and easy to adjust to different uses by the simple manipulating of a single nut; that can be used as a weeder as well as a lawn edger and trench cutter; and that can be made very light but durable and made cheap to manufacture.

An important feature of the invention resides in the supporting or guiding runner that is interchangeable and operates horizontally on either side of the handle, thus regulating the size and depth of the trench or groove cut, from either the contour of the grass or earth or top surface of the adjacent walk, wall or drive.

We desire that it be understood that various changes may be made in the several details of construction, without departing from the spirit of the invention and without sacrificing any of the advantages thereof that are new and useful.

Having now fully shown and described our invention, what we claim and desire by Letters Patent is:

An adjustable guiding runner attachment for a lawn edger, said runner comprising a long flat narrow strip of metal or the like curved at one end to present a leading edge and having means for adjustable attachment to the handle of a lawn edger at the other end, said means including a holder a wing nut and a bolt, whereby the guiding runner is susceptible of vertical horizontal and revolving adjustment relative to the associated lawn edger to regulate the width and depth of groove cut by the said associated lawn edger.

JACOB APFEL.
GEORGE LING.
RICHARD S. JARRETT.